May 18, 1965   R. L. SAMPSON ETAL   3,184,064
DOMESTIC WATER FILTER
Filed June 12, 1961   3 Sheets-Sheet 1
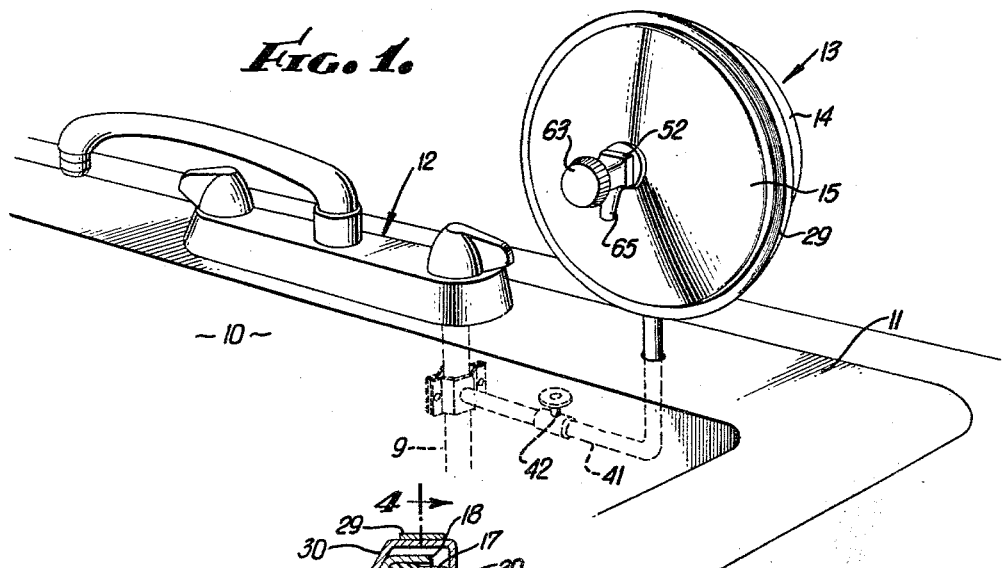
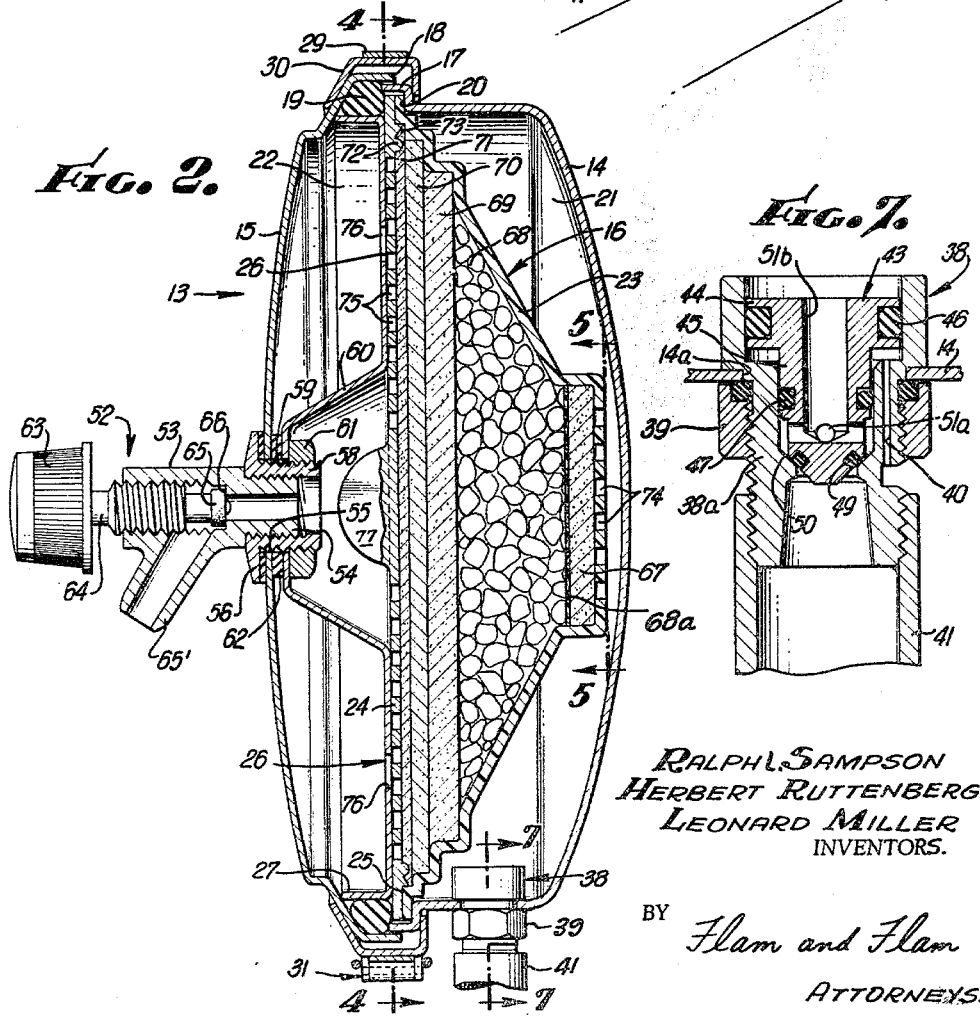
RALPH L. SAMPSON
HERBERT RUTTENBERG
LEONARD MILLER
INVENTORS.
BY Flam and Flam
ATTORNEYS.

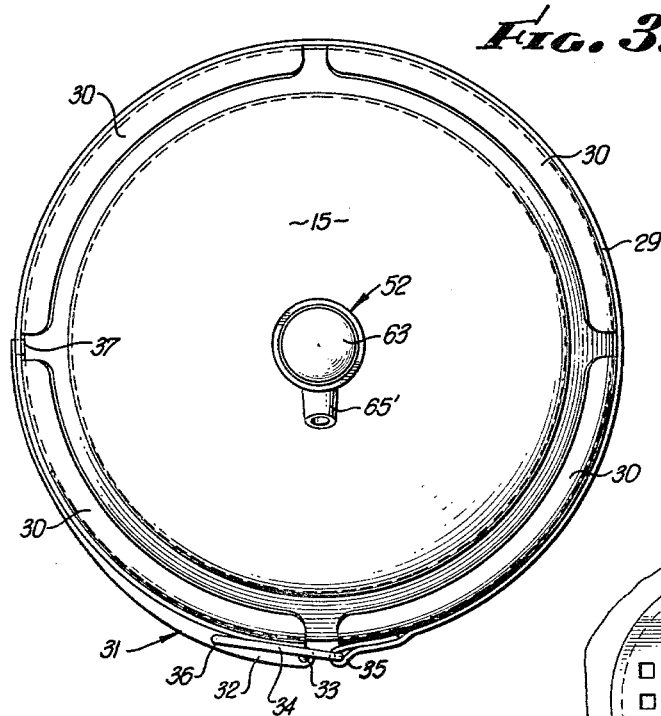
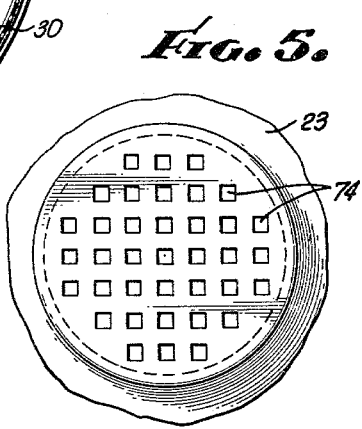
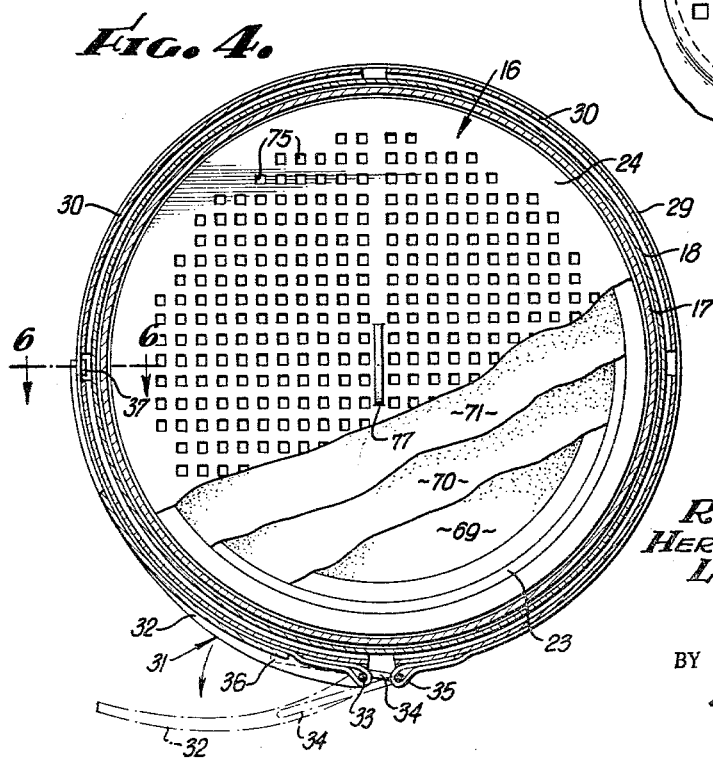
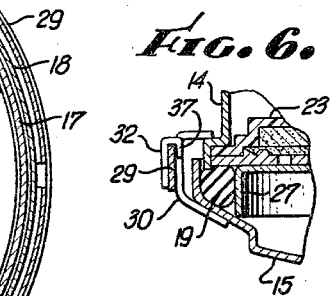
Ralph L. Sampson
Herbert Ruttenberg
Leonard Miller
INVENTORS.
BY Flam and Flam
ATTORNEYS.

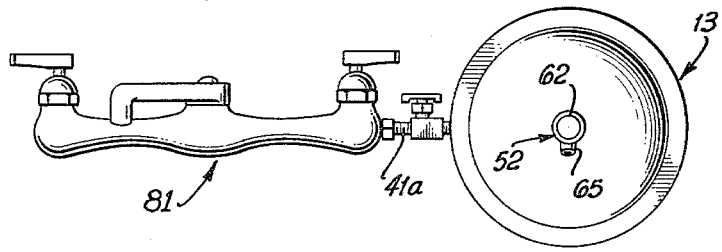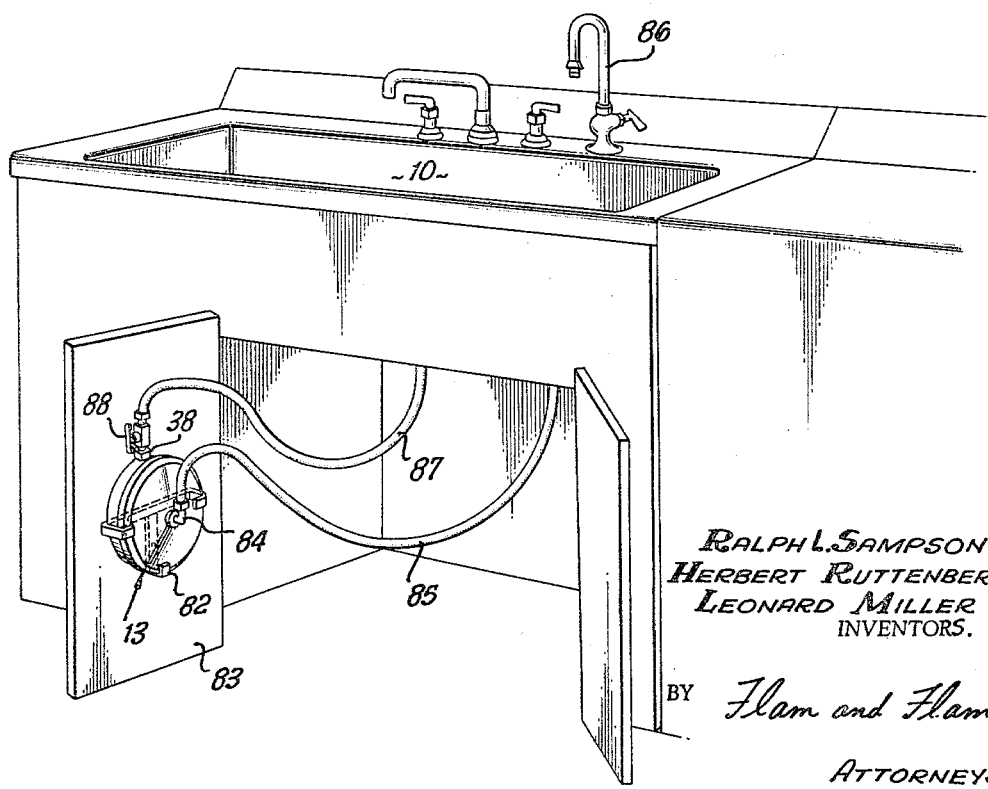

United States Patent Office 3,184,064
Patented May 18, 1965

3,184,064
DOMESTIC WATER FILTER
Ralph L. Sampson, Encino, Herbert Ruttenberg, Los Angeles, and Leonard Miller, Encino, Calif., assignors to Water Gard Corporation, Los Angeles, Calif., a corporation of California
Filed June 12, 1961, Ser. No. 116,566
3 Claims. (Cl. 210—136)

This invention relates to a water filter especially suited for home use.

Water from a domestic supply contains suspended material such as algae, sand, rust and also material in solution, such as chlorine and sulphur. Such material is not only offensive to the senses, but also a health hazard. There is an increased in demand, therefore, for a separate supply of pure water for cooking and drinking purposes.

One object of this invention is to provide a compact water filter that may be installed in a manner convenient to use and service. The filter is designed to permit interference-free mounting alongside a sink fixture. For this purpose, the filter is of relatively flat disk form so that with its axis horizontal, it takes very little space above the rear deck of the sink. The filter may also be installed beneath the sink and connect to an auxiliary spigot valve mounted on the sink deck. In order to facilitate cleaning and replacement, a bracket is provided in which the filter is removably accommodated, and flexible conduits with adequate slack provide the connections to the filter. The entire filter can then be lifted over the sink before it is opened.

Another object of this invention is to provide an improved filter structure of this character in which the housing is easily opened for insertion and removal of the filter element. For this purpose, use is made of a toggle clamp mechanism that has novel locking provisions for ensuring against its accidental opening.

Another object of this invention is to provide a unique filter element in which the entrained material collects entirely on the inside, so that the replacement of the filter element is neither messy nor offensive.

Another object of this invention is to provide an improved domestic water filter of this character in which the single element has a flange seating upon the rim of one of the housing parts whereby a single O-ring seal may be utilized, not only to prevent leakage beyond the housing, but also to define with the filter element an influent chamber and an effluent chamber.

Still another object of this invention is to provide a simple single disk filter element for use in the filter structure, and that of itself provides novel sealing provisions for confining flow to a desired path.

Still another object of this invention is to provide a unique filter element that provides seats for successive filter layers which may be arranged and selected in accordance with the characteristics of the local water supply.

Still another object of this invention is to provide a filter structure of this character in which all of the parts are accessible for easy cleaning.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a pictorial view of a kitchen sink at which a filter incorporating the present invention is installed;

FIG. 2 is an axial sectional view of the filter structure;

FIG. 3 is a front view of the filter structure;

FIG. 4 is a transverse sectional view taken along the plane indicated by line 4—4 of FIG. 2, the various layers of the filter element being successively broken away and shown in elevation;

FIG. 5 is a fragmentary sectional view taken along a plane indicated by line 5—5 of FIG. 2;

FIG. 6 is an enlarged fragmentary sectional view taken along a plane corresponding to line 6—6 of FIG. 4;

FIG. 7 is an enlarged fragmentary sectional view taken along a plane corresponding to line 7—7 of FIG. 2;

FIG. 8 is a pictorial view similar to FIG. 1, showing an alternate installation in connection with a wall mounted plumbing fixture; and FIG. 9 is a pictorial view similar to FIGS. 1 and 8 showing a below deck installation.

In FIG. 1 there is illustrated, by way of example, a kitchen sink 10 having a peripheral deck 11. At the center of the rear portion of the deck 11 is a swing spout faucet structure 12 of conventional design. A watet supply conduit 9 supplies water to the cold water valve of the faucet 12. On one side of the faucet 12, the new filter structure 13 is mounted.

The filter structure 13 is made of two circular parts 14 and 15 (FIG. 2) that fit together at their peripheries to define a housing for a filter element 16. The housing part 14 which may be made of stainless steel has an opening defined by a rim 17. The housing part 15, also made of stainless steel, has a peripheral cylindrical flange 18 that fits over the rim 17 and forms a cover for the opening of the part 14. A seal between the flange 18 and the rim 17 is established by a rubber or equivalent ring 19 carried within the flange 18. The ring 19, normally of circular cross section, annularly engages the end of the rims to establish a seal.

The periphery of the filter element 16 fits within the rim 17, and is confined against the radial shoulder 20 at the base of the rim 17 by the sealing ring 19. The filter 16 and the ring 19 together divide the housing into an influent chamber 21 on one side of the filter element 16 and an effluent chamber 22 on the other side of the filter element 16. The influent chamber 21 is located at the housing part 14 and the effluent chamber is located at the cover 15.

The filter element 16 is a self-contained replaceable unit incorporating a series of filtering members accommodated in generally frusto-conical filter cage 23. The apex end of the cage 23 is perforated. A perforate cap 24 closes the large or base end of the cage 23. The periphery of the cap 24 abuts a peripheral flange 25 of the cage 23. The parts 23 and 24, which are made of material such as styrene or polyethylene, are fused or cemented together. The filtering members in the cage will be described more fully hereinafter.

A backing plate 26 also made of plastic, and attached to the inside of the cover 15 in a manner to be hereinafter described, overlies the cap 24 and supports the element against deformation due to the preponderance of pressure in the influent chamber 21. However, the conical configuration of the filter element itself provides a substantial measure of rigidity. The backing plate 26 has a cylindrical rim 27 about which the sealing ring 19 extends. Accordingly, the sealing ring is held in position for cooperation with the housing rim 17 and the filter element periphery as the cover 15 and housing part 14 are urged together.

In order to draw the sealing ring 19 and the cover 15 toward the housing part 14, a clamping band 29 (see also FIGS. 3 and 4) is provided. Welded to the clamping band are four arcuate channels 30 that on one side fit behind the rim 17 of the housing part 14 and on the other over the cover flange 18. The wall of the cover 15 adjoining the flange 18 is conically formed as are the corresponding channel sides. Accordingly, as the band 29 is constricted, the reaction between the conical portions produces the requisite axial component of movement between the housing parts.

In order to constrict the band, a toggle 31 is provided (FIG. 3). Thus, an arcuate toggle lever 32 is pivotally connected, as at axis 33, at one looped end of the band 29, and a toggle link 34 is pivotally connected, as at axis 35 to the other looped end of the band 29. The toggle link 34 is also pivoted to the toggle lever 32 at an axis 36 spaced from the axis 33. As the toggle lever 32 is moved from the open position of FIG. 4 to the closed position of FIG. 3, a line joining the axes 35 and 36 passes beyond the axis 33 and the overcenter relationship maintains the toggle lever 32 stably in the closed position of FIG. 3. However, since the lever is near a center of activity, there is a danger of the lever 32 being accidentally engaged. To prevent accidental opening, the end of the toggle lever 32 has a latching finger 37 that can, by transverse flexure of the lever 32, be positioned beneath the band 29 at the space between adjacent channels 30. In addition, the separation between two of the channels 30 provides a space for entry of the latching finger 37 beneath the band 29.

To remove the band 29 and the cover 15, the toggle lever 32 can be easily flexed by lateral movement to release the finger 37. Due to the spacing of the several channels 30, flexure of the band 29 is easily accomplished for clearance with respect to the housing parts.

Water is supplied to the influent chamber 21 through a fitting 38 attached to a peripheral wall of the housing part 14. The fitting has a reduced stem 38a that extends through an aperture 14a in the housing 14. A nut 39 engaging the reduced stem 38a clamps the fitting 38 in place. A suitable O-ring sealing ring is urged by the nut about the edge of the aperture 14a as well as about the fitting 38. The fitting 38 is suitably mounted at an aperture in the sink deck 11. A conduit 41 extending from the fitting 38 and beneath the sink connects to the supply line 9 in a suitable manner. A shut-off valve 42 is interposed in the conduit 41.

Since the filter structure incorporates one filter element, its effective area must be larger than if a multiple filter element structure were provided in order to achieve equal filtering. Correspondingly, the cover 15 has a large area. Water pressure acting over the entire area of this cover may be substantial, especially, in areas where the domestic water pressure is high. For this purpose, the fitting 38 incorporates a differential piston structure 43 that reduces the pressure in the filter housing with reference to the source pressure.

The differential piston 43 has parts that work in cylinder spaces provided by the bore of the fitting 38. A larger piston part 44 works in the larger inner end of the fitting bore, and a smaller piston part 45 works in the smaller part of the fitting bore located at about the center of the fitting 38. O-rings 46 and 47 provide suitable seals for the piston parts 44 and 45. The space between the piston parts is vented, as indicated at 40. The smaller piston part 45 is therefore subjected to the pressure of the supply, and the larger piston part is therefore subjected to the pressure in the influent chamber 21. The piston 43 thus moves outwardly or inwardly as the pressure in the influent chamber exceeds or is less than the source pressure multiplied by the ratio of the diameters of the smaller piston part 45 to the larger piston part 44.

The end of the smaller piston part 45 is provided with a closure in the form of a circular ring 49 that engages a conical seat 50 formed at the end of the cylinder space for the smaller piston part 45. When the closure 49 engages the seat 50, communication between the supply and the influent chamber 21 is interrupted. When the differential piston 43 is moved to closed position, communication between the supply and the influent chamber 21 is interrupted. When the differential piston 43 is moved to open position, communication is established via passage means in the piston structure 43. Two cross bores 51a intersect the bottom of an axially extending upwardly opening recess 51b. The outer ends of the cross bores 51a are above the closure ring 49 and hence are exposed to the supply when the piston 43 is lifted. By providing two cross bores 51a rather than just one, fluid forces stabilize the piston against tilting, and chattering is avoided. The piston structure 43 operates automatically to maintain pressure in the influent chamber at a fixed fraction of source pressure.

A dispensing spout 52 is mounted at the center of the cover 15. The spout 52 has a through apertured body 53 provided with a reduced threaded shank 54 that engages the threaded opening of an adapter fitting 58. The adapter fitting 58 has a flange 56 clamped against the outside of the cover 15 by a nut 61 threaded about the inner end of the fitting 58. While the flange 56 could be non-circular to allow its engagement by a suitable tool in order to hold it in place while the nut 61 is turned, it is, instead, circular. The fitting 58 has a milled side, and the aperture 55 of the cover has a configuration to fit the fitting 58. No tool need be used to hold the fitting 58, and the finish of the cover is not marred.

The nut 61 also clamps the backing plate 26 to the cover 15. For this purpose, the backing plate 26 has a mounting dome 60 provided with an aperture 59 that fits over the adapter fitting 58. A cushioning ring 62 is interposed between cover 15 and the backing plate dome 60. The faucet body 53, backing plate 26 and cover 15 are thus connected for unit removal and replacement.

The faucet 52 has suitable valve provisions. Thus a stem 64 is mounted in the outer threaded end of the body hole and carries a closure 65 engageable with a valve seat 66 formed intermediate the body hole. A knob 63 attached to the outer end of the stem 64 lifts and seats the valve closure 65. When the valve is open, water passes through an outlet spout 65'. The spout can be oriented downwardly no matter what the orientation of the influent aperture 14a may be. This follows since the cover 15 at the area of engagement with the housing 14 is annular, and adjustment of the position of the spout is achieved by relative angular movement of the cover 15 and the housing 14.

The removable filter element 16 has five juxtaposed coaxial circular members or layers 67, 68, 69, 70 and 71 of successively larger diameters extending from the cage apex to the cap 24. The first member 67, made of foam plastic, filters out the larger suspended matter, water entering from the apex of the cage 23. The second layer 68 comprises carbon granules for eliminating odors and tastes, and is held in place by the first layer 67. A diffuser plate 68a is interposed between the layers 67 and 68. The size of the granules is substantially exaggerated in the drawings. The third layer 69, also of foam plastic, carries diatomaceous earth material for filtering out the smaller particles. The fourth and fifth layers 70 and 71 in two stages isolate the diatomaceous earth material from the effluent chamber. The layer 70 may be made of foam plastic, and in effect forms a septum or divider. The layer 71 may be made of asbestos cellulose having an effective cell dimension smaller than that of the layer 70, say of the order of 0.005 inch.

A variety of materials can be used for the filter members 67, 69, 70 and 71, such as felt, linen, asbestos, cellulose, Dacron, or other fibrous material. Furthermore the filtering and purifying characteristics of each layer may be selected in order to provide filter elements especially designed with reference to the characteristics of local water supplies.

The cage 23 has interior annular steps so as to fit or form seats for the circular foam and asbestos cellulose disks 67, 69, 70 and 71. The diatomaceous earth carrying filter member 69 has a marginal area in contact with the cage 23 beyond the margin of the preceding filter member 68. This in effect is a seal, confining flow through, rather than around, the member 69. Similarly, the fourth filter member 70 has a marginal area in contact with the cage 23 beyond the margin of the preceding filter member 69, and a seal is also effected. Similarly, the fifth filter member 71 has a marginal area contacting the cage 23 beyond the filter member 70.

There are special sealing provisions for the fifth filter member 71 doubly to ensure against flow along the interior of the cage 23. Thus, the cap 24 has an interior annular bead or projection 72 that locally compresses the asbestos cellulose member 71 so that effective cell dimension is greatly reduced. The effect is a seal. An indexing flange 73 formed on the interior of the cap 24 ensures proper positioning of the bead 72.

The apertures 74 and 75 in the cone apex and cap 24 are quite large, the filtering being achieved entirely within the filter element 16. Apertures 76 in the backing plate 26 equalize pressure on opposite sides thereof.

An integral finger piece 77 formed on the cap 24 serve as a convenient means for manipulating the filter element. The finger piece is always clean since it is located at the effluent chamber. The dome 60 on the backing plate 26 provides clearance for the finger piece.

The filter structure 13, as is evident, is shown devoid of water in FIG. 2. In operation, water to be filtered is supplied through the fitting 38 to the influent chamber 21, from which it flows through the relatively large apertures 74 into the filter unit 16. The water then diffuses within the unit 16, flowing successively through the coaxial, progressively larger in diameter filter members to the perforate cap 24.

When the filtered water reaches the cap 24 it enters the large plurality of apertures 75, which, as shown, extend over nearly the entire area of said cap. The filtered water entering those apertures 75 which are exposed to the dome 60 flows directly into said dome. That portion of the filtered water entering the apertures 75 disposed radially outwardly from the dome 60, being under a substantial pressure derived from the line 41, is forced by such pressure to flow between the cap 24 and its backing plate 26 to the dome 60, the sealing ring 19 being effective to prevent the filtered water from flowing back into the influent chamber 21. The porous rear filter members 70 and 71 also provide a flow path to the dome 60 for the filtered water, from the entire rear surface of the cap 24 through the apertures 75 exposed within said dome. Filtered water entering the dome 60 is then drawn therefrom through the spout 52.

In the form shown in FIG. 8, a conduit 41a taps into the cold water inlet at a wall mounted faucet 81.

In the form shown in FIG. 9, a filter structure 13 is mounted in a bracket 82 attached conveniently on the inside of a door 83 of a sink cabinet. In place of the spout 52, a right angle fitting 84 is provided. Flexible conduit 85 connects to a dispensing fixture 86 mounted at the sink. A second flexible conduit 87 from the supply line connects to a shut-off valve 88 that is attached to the outwardly projecting shank of the influent fitting 38.

There is adequate slack in the conduits 85 and 87 to allow the filter to be removed from its bracket 82 and placed over the sink for servicing. Water from the filter is expeditiously handled by the sink.

The inventors claim:

1. A filter element for entraining material, filtered from a fluid, substantially entirely within the element and removably insertable as a unit in the housing of a filter structure, comprising: a generally frusto-conical filter cage open at its base, outlet end and having a perforate apex, inlet end with a plurality of apertures therein, each of said apertures having an area sufficiently large to provide for entry of the fluid to be filtered in its original condition into the inside of the filter element, said frusto-conical cage being stepped to provide a plurality of axially spaced annular seats of successively increasing diameter in a direction away from said apex, inlet end; a plurality of coaxially aligned, juxtaposed porous filter members within said cage and arranged to receive fluid from said apex, inlet end of said cage, each of said filter members being in contact with its neighboring filter member, said filter members successively increasing in diameter in a direction away from said apex inlet end of said cage, and having their outer peripheries received within said annular seats; and a perforate cap member secured to and closing the base, outlet end of the filter cage, said filter members being held in engagement with said apex, inlet end of said cage, their respective annular seats, and each other by said cap member, and said cap member having an internal annular projection thereon spaced inwardly from the peripheral edge thereof, the outer peripheral edge portion of the filter member adjacent said cap member being clamped in sealing engagement between said annular projection and said filter cage.

2. A filter structure, comprising: a housing formed by a pair of cover members; a filter element disposed within the housing to define with said cover members an influent chamber and an effluent chamber, and removably insertable as a unit in said housing, said filter element comprising: a generally frusto-conical filter cage open at its base, outlet end and having a perforate apex, inlet end with a plurality of apertures therein, each of said apertures having an area sufficiently large to provide for entry of the fluid to be filtered in its original condition into the inside of the filter element, said frusto-conical cage being stepped to provide a plurality of axially spaced annular seats of successively increasing diameter in a direction away from said apex, inlet end; a plurality of coaxially aligned, juxtaposed porous filter members within said cage and arranged to receive fluid from said apex, inlet end of said cage, each of said filter members being in contact with its neighboring filter member, said filter members successively increasing in diameter in a direction away from said apex inlet end of said cage, and having their outer peripheries received within said annular seats; and a perforate cap member secured to and closing the base, outlet end of the filter cage, said filter members being held in engagement with said apex, inlet end of said cage, their respective annular seats, and each other by said cap member, and said cap member having an internal annular projection thereon spaced inwardly from the peripheral edge thereof, the outer peripheral edge portion of the filter member adjacent said cap member being clamped in sealing engagement between said annular projection and said filter cage; and means for reducing the fluid pressure in the influent chamber with reference to the fluid source pressure.

3. A filter structure according to claim 2 in which the means for reducing fluid pressure in the influent chamber with reference to the fluid source pressure comprises a fitting member with a passage for fluids into the influent chamber, and having an upper larger cylindrical cavity opening into the influent chamber, and a lower smaller cylindrical cavity registerable with an influent conduit, and having its lower end formed into a valve seat, a reciprocating piston having a larger upper end positioned within the upper cavity and in sealing engagement therein and a smaller lower end positioned within the lower cavity and in sealing engagement therein, said upper and lower ends having a vent between them, said piston terminating at its lower end with a valve closure seating on the valve seat, and having openings permitting fluid passing the valve seat to enter the influent chamber.

(References on following page)

References Cited by the Examiner

UNITED STATES PATENTS

| | | | |
|---|---|---|---|
| 164,257 | 6/75 | Brach | 210—449 X |
| 649,082 | 5/00 | Stahle | 210—449 X |
| 732,659 | 6/03 | Scott | 210—314 |
| 776,550 | 12/04 | Rice | 210—249 X |
| 815,558 | 3/06 | Rosier | 215—96 |
| 1,014,843 | 1/12 | Nobles | 210—318 X |
| 1,045,616 | 11/12 | Sauer | 210—445 |
| 1,056,800 | 3/13 | Krause | 210—502 |
| 1,635,347 | 7/27 | Rogginger. | |
| 1,873,782 | 8/32 | Nixon. | |
| 1,913,116 | 6/33 | Haimbaugh. | |
| 1,981,877 | 11/34 | Pierce | 210—502 |
| 2,037,332 | 4/36 | Lieberman | 210—287 X |
| 2,048,350 | 7/36 | McLean | 210—451 X |
| 2,098,102 | 11/37 | McLean | 210—451 |
| 2,103,425 | 12/37 | Lehman | 210—449 |
| 2,277,737 | 3/42 | Wilkinson | 210—249 |
| 2,292,310 | 8/42 | Wilkins | 220—5 X |
| 2,321,220 | 6/43 | Lieberman | 210—449 X |
| 2,328,381 | 8/43 | Jaffe | 210—449 X |
| 2,579,974 | 12/51 | Scott et al. | 220—550 |
| 2,727,634 | 12/55 | O'Meara | 210—456 X |
| 2,818,178 | 12/57 | Hodsdon | 210—455 X |
| 2,822,926 | 2/58 | Walton | 210—486 |
| 2,895,613 | 7/59 | Griffiths | 210—445 X |
| 3,007,485 | 11/61 | Barker. | |

GEORGE D. MITCHELL, *Primary Examiner.*

HERBERT L. MARTIN, ROBERT F. BURNETT,
*Examiners.*